(12) United States Patent
Pohlenz (10) Patent No.: US 11,120,643 B2
(45) Date of Patent: Sep. 14, 2021

(54) DEVICE, METHOD AND COMPUTER PROGRAM FOR A VEHICLE FOR PROVIDING AN ACCIDENT NOTIFICATION REGARDING AN ACCIDENT TO AN EMERGENCY CALL CENTER

(71) Applicant: Volkswagen Aktiengesellschaft, Wolfsburg (DE)

(72) Inventor: Christian Pohlenz, Aachen (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 236 days.

(21) Appl. No.: 16/469,448

(22) PCT Filed: Dec. 13, 2017

(86) PCT No.: PCT/EP2017/082499
§ 371 (c)(1),
(2) Date: Jun. 13, 2019

(87) PCT Pub. No.: WO2018/114492
PCT Pub. Date: Jun. 28, 2018

(65) Prior Publication Data
US 2020/0098200 A1 Mar. 26, 2020

(30) Foreign Application Priority Data
Dec. 19, 2016 (DE) ...................... 10 2016 225 437.5

(51) Int. Cl.
| | |
|---|---|
| *G07C 5/00* | (2006.01) |
| *H04W 4/46* | (2018.01) |
| *B60R 21/0134* | (2006.01) |
| *G06K 9/00* | (2006.01) |
| *B60R 21/00* | (2006.01) |

(52) U.S. Cl.
CPC .......... *G07C 5/008* (2013.01); *B60R 21/0134* (2013.01); *G06K 9/00825* (2013.01); *H04W 4/46* (2018.02); *B60R 2021/0027* (2013.01)

(58) Field of Classification Search
CPC . G07C 5/008; H04W 4/46; B60R 2021/0027; G08G 1/205
See application file for complete search history.

(56) References Cited

U.S. PATENT DOCUMENTS 8,054,168 B2 * 11/2011 McCormick ........... G07C 5/008
340/436
8,321,092 B2 * 11/2012 Browne ................. G01S 13/86
701/46
(Continued)

FOREIGN PATENT DOCUMENTS

| DE | 10338759 A1 | 3/2005 | ............. G07C 5/00 |
| DE | 102006031240 A1 | 1/2008 | ............. G08B 21/02 |

(Continued)

OTHER PUBLICATIONS

German Office Action, Application No. 102016225437.5, 7 pages, dated Sep. 22, 2017.
(Continued)

*Primary Examiner* — Michael J Zanelli
(74) *Attorney, Agent, or Firm* — Slayden Grubert Beard PLLC (57) ABSTRACT

The invention relates to a device, a method and a computer program for a vehicle for providing an accident notification regarding an accident to an emergency call center. The device includes at least one sensor interface designed to receive sensor data from internal sensors and external sensors of the vehicle. The device furthermore includes at least one communication interface designed to communicate with the emergency call center. The device furthermore includes a control module designed to control the at least one sensor (Continued)

interface and the communication interface. The control module is furthermore designed to determine information about occupants in the vehicle based on the sensor data. The control module is furthermore designed to determine information about other road users that are involved in the accident based on the sensor data. The information about the other road users involved in the accident is subdivided into several categories. The plurality of categories includes at least the categories of pedestrians, two-wheeled vehicles and automobiles. The control module is furthermore designed to provide information about the accident notification via the communication interface based on the information about the occupants in the vehicle, and based on the information about the other road users involved in the accident based on the sensor data.

15 Claims, 2 Drawing Sheets

(56) References Cited

U.S. PATENT DOCUMENTS

| | | | | |
|---|---|---|---|---|
| 9,102,261 | B2 * | 8/2015 | Chang | B60Q 9/00 |
| 9,886,841 | B1 * | 2/2018 | Nave | G06F 30/20 |
| 2007/0132564 | A1 | 6/2007 | Dickmann et al. | 340/436 |
| 2009/0015684 | A1 | 1/2009 | Ooga et al. | 348/222.1 |
| 2011/0124311 | A1 | 5/2011 | Stählin | 455/404.2 |
| 2013/0267194 | A1 | 10/2013 | Breed | 455/404.2 |
| 2016/0096499 | A1 * | 4/2016 | Nanao | G08B 25/006 |
| | | | | 701/32.2 |

FOREIGN PATENT DOCUMENTS

| | | | | |
|---|---|---|---|---|
| DE | 102009017984 | A1 | 10/2009 | G08B 25/10 |
| DE | 102008042013 | A1 | 3/2010 | G07C 5/08 |
| DE | 102010001006 | A1 | 7/2011 | B60R 21/013 |
| DE | 102014005048 | A1 | 11/2014 | G08B 25/10 |
| DE | 102013013906 | A1 | 2/2015 | B60R 21/0134 |
| DE | 102015011516 | A1 | 5/2016 | G08B 25/10 |
| DE | 102016225437 | A1 | 6/2018 | G08B 25/10 |
| EP | 2273469 | A1 | 1/2011 | B60R 21/015 |
| FR | 2887064 | A1 | 12/2006 | G01S 3/00 |
| GB | 2528477 | A | 1/2016 | B60R 21/01 |
| WO | 2018/114492 | A1 | 6/2018 | G07C 5/00 |

OTHER PUBLICATIONS

International Search Report and Written Opinion, Application No. PCT/EP2017/082499, 17 pages, dated Apr. 6, 2018.

* cited by examiner

DEVICE, METHOD AND COMPUTER PROGRAM FOR A VEHICLE FOR PROVIDING AN ACCIDENT NOTIFICATION REGARDING AN ACCIDENT TO AN EMERGENCY CALL CENTER

CROSS-REFERENCE TO RELATED APPLICATIONS

This application claims priority to German Patent Application No. DE 10 2016 225 437.5, filed on Dec. 19, 2016 with the German Patent and Trademark Office. The contents of the aforesaid application are incorporated herein for all purposes.

TECHNICAL FIELD

The invention relates to a device, a method, and a computer program for a vehicle for providing information on an accident notification regarding an accident to an emergency call center, more precisely but not exclusively, based on sensor data from sensors of the vehicle.

BACKGROUND

The safety of occupants in vehicles assumes an important role in the development of vehicles. Safety approaches frequently include several measures for increasing driving safety, from a structural protection of the occupant cell, to airbags and belt tightening systems, to an automated transmission of emergency calls with the aim of being able to better protect occupants in the vehicle in case of an accident.

Furthermore, vehicles are frequently interlinked today, for example to central offices of the vehicle manufacturer, to a voice, or respectively data link, or directly to other vehicles or transport infrastructure on the roadside. For example, the interlinking of vehicles enables the transmission of data with several communication partners, for example in order to be able to provide vehicle functions in the interlinked vehicles. For example, the interlinking of vehicles can enable a transmission of vehicle data that can be used by central control centers such as traffic jam control centers, for example to coordinate route guidance of several vehicles with each other. In the transmission of data, it frequently must be ensured that a private sphere of the vehicle owner and other vehicles is to be retained.

SUMMARY

A need exists for an improved approach for an emergency call function of a vehicle that enables increased driving safety.

The independent claims take this need into account. Embodiments are discussed in the dependent claims and the following description.

DETAILED DESCRIPTION

Exemplary embodiments establish a device, method and computer program for a vehicle for providing an accident notification regarding an accident to an emergency call center. The device is designed to collect (for example by object recognition with a camera or a radar sensor) both information about the occupants in the vehicle as well as information about the other participants involved in the accident based on vehicle sensor data, for example from internal sensors and external sensors, and to provide this information, for example in a schematic form, to an emergency call center. For example, the device may be enabled to prepare data and provide it to a remote station that processes this data. Furthermore, the device may for example be designed to predict an impending collision and buffer and evaluate corresponding sensor data in order to be able to provide the emergency notification as quickly as possible, and to be able to work with sensor data that are intact as possible.

Exemplary embodiments establish a device for a vehicle for providing an accident notification regarding an accident to an emergency call center. The device includes at least one sensor interface designed to receive sensor data from internal sensors and external sensors of the vehicle. The device furthermore includes at least one communication interface designed to communicate with the emergency call center. The device furthermore includes a control module designed to control the at least one sensor interface and the communication interface. The control module may furthermore be designed to determine information about occupants in the vehicle based on the sensor data. The control module may furthermore be designed to determine information about other road users involved in the accident based on the sensor data. The information about the other road users involved in the accident is subdivided into a plurality of categories. The plurality of categories includes at least the categories of pedestrians, two-wheeled vehicles and automobiles. The control module is furthermore designed to provide information about the accident notification via the communication interface based on the information about the occupants in the vehicle, and based on the information about the other road users involved in the accident based on the sensor data.

The device may for example transmit detailed data on the emergency call (anonymously) to the emergency call center which may enable a first responder to more specifically plan rescue operations. Consequently in many cases, it may be achieved that a sufficient number of emergency vehicles is available on-site, and road user safety is increased.

For example, the sensor data may include image data from an external camera sensor of the vehicle. The control module may be designed to recognize at least some of the other road users involved in the accident based on object recognition in the image data. The control module may be designed to categorize the other road users involved in the accident into the plurality of categories based on the object recognition.

The object recognition may for example recognize relevant accident details for the emergency services and thus enable a more precise planning of the response. Furthermore, the object recognition may for example enable a calculation of a schematic representation of the accident and thus ensure a private sphere of the other road users as well as reduce transmitted data volume.

In at least several exemplary embodiments, the control module may be designed to recognize a pending collision based on the sensor data. The control module may be designed to buffer the sensor data based on the pending collision. Accordingly, the buffered sensor data may for example be used for an analysis of the accident situation, or a reconstruction of the course of the accident. Furthermore, valid sensor data may be available for analysis even when vehicle sensors are damaged during the accident. For example, the control module may be designed to determine the information about the other road users involved in the accident based on sensor data that were received before the collision.

For example, the at least one communication interface may furthermore be designed for vehicle-to-vehicle communication with at least some of the other road users. The control module may be designed to receive information about occupants in vehicles of the other road users via vehicle-to-vehicle communication. The control module may be designed to determine the information about the other road users involved in the accident based on the information about the occupants in vehicles of the other road users. For example, the information about the occupants in vehicles of the other road users may include information about injuries of the occupants in vehicles of the other road users. This way, for example, detailed information about potentially injured road users may be collected.

For example, the control module may be designed to receive additional sensor data from at least some of the other road users. The control module may be designed to determine the information about the other road users involved in the accident based on the additional sensor data. This may for example enhance a sensor range and an accumulated precision of sensors which are used for determining the information about the other road users involved in the accident.

For example, the information about the accident notification may include information about a number of road users involved in the accident, and/or information about a number of occupants in vehicles of the road users involved in the accident. This way, for example, more precise response planning of response vehicles may be enabled.

For example, the sensor data may include image data from an external camera sensor of the vehicle. The control module may be designed to provide the information about the accident notification based on the image data. The information about the accident notification may include a schematic representation of the accident based on the image data. Accordingly, the schematic representation of the accident may for example include an image file of the accident in which the additional road users have been replaced by schematic representations. Alternatively or in addition, the schematic representation of the accident may for example include a three-dimensional model of the accident, for example as a still image, or as a reconstruction of the accident in several phases.

Exemplary embodiments furthermore provide a method for a vehicle for providing an accident notification regarding an accident to an emergency call center. The method includes receiving sensor data from internal sensors and external sensors of the vehicle. The method furthermore includes determining information about occupants in the vehicle based on the sensor data. The method furthermore includes determining information about other road users involved in the accident based on the sensor data. The information about the other road users involved in the accident is subdivided into a plurality of categories. The plurality of categories includes at least the categories of pedestrians, two-wheeled vehicles and automobiles. The method furthermore includes providing information about the accident notification based on the information about the occupants in the vehicle, and based on the information about the other road users involved in the accident based on the sensor data.

Exemplary embodiments furthermore establish a program with a program code for performing the method when the program code is run on a computer, a processor, a control module or a programmable hardware component.

Additional exemplary embodiments will now be described in greater detail with reference to the accompanying drawings. The invention however is not limited to these embodiments. In the FIGS., the dimensions of the thickness of the lines, layers and/or regions may be shown exaggerated for the sake of clarity.

In the following description of the accompanying FIGS. that only show a few exemplary embodiments, the same reference numbers may designate the same or comparable components. Furthermore, summary reference numbers may be used for components and objects that appear several times in an exemplary embodiment or in a drawing but that are jointly described with regard to one or more features. Components or objects that are described with the same or summary reference numbers may be designed the same but also perhaps differently with respect to an individual, several or all features, for example its dimensions, if not otherwise revealed explicitly or implicitly in the description.

Although exemplary embodiments may be modified and changed in different ways, exemplary embodiments are shown as examples in the FIGS. and will be described in detail in this context. It should, however, also be noted that it is not intended to restrict exemplary embodiments to the disclosed design; rather, the exemplary embodiments are to cover all functional and/or structural modifications, equivalents and alternatives that lie within the scope of the invention. In the description and FIGS., equivalent reference numbers refer to equivalent or similar elements.

It should be borne in mind that an element that is designated as being "connected" or "coupled" to another element may be directly connected or coupled to the other element, or there may also be intermediate elements. If an element is designated as being "directly connected" or "directly coupled" to another element, there are no intermediate elements. Other terms that are used to describe the relationship between elements should be interpreted in a similar manner (for example "between" in comparison to "directly between", "adjacent" in comparison to "directly adjacent", etc.).

The terminology that is used herein only serves to describe certain exemplary embodiments and should not restrict the exemplary embodiments. As used herein, the singular forms "a" "of a" and "the" should also include the plural form as long as the context does not clearly indicate otherwise. It is further noted that the expressions such as "contains", "containing", "has, "includes", "comprising" and/or "having" as used herein indicate the presence of the mentioned features, whole numbers, steps, work processes, elements and/or components, but does not exclude the presence or addition of one, or respectively one or more features, whole numbers, steps, work processes, elements, components and/or groups.

If not otherwise defined, all of the terms used herein (including technical and scientific terms) have the same meaning that an average person in the art in the field to which the exemplary embodiments belong would attribute to them. It should further be noted that expressions such as those that are defined in generally used dictionaries should be interpreted as if they had the meaning that is consistent with their meaning in the context of the relevant field, and are not to be interpreted in an idealized or excessively formal sense as long as this is not expressly defined herein.

Figure 1:
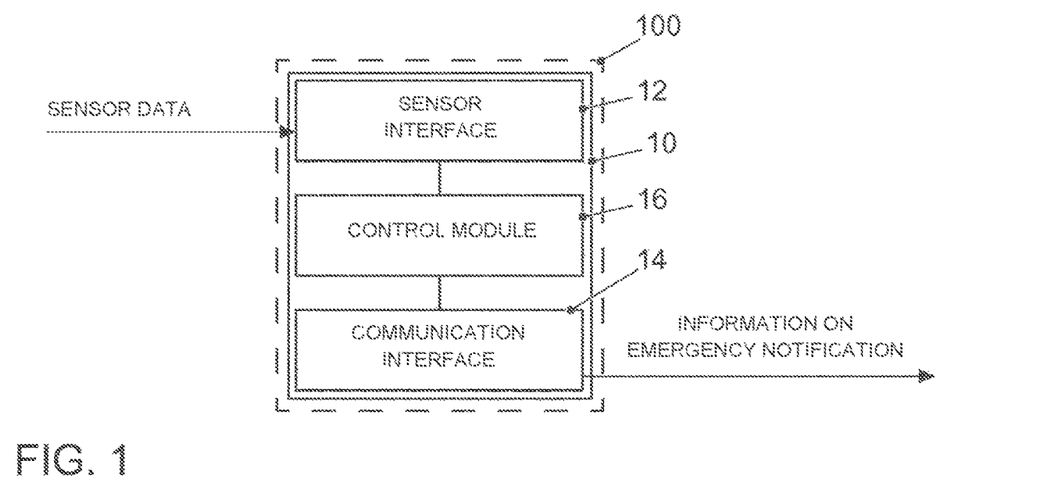
FIG. 1 shows a block diagram of a device for a vehicle for providing an accident notification regarding an accident to an emergency call center.

FIG. 1 shows a block diagram of a device 10 for a vehicle 100 for providing an accident notification regarding an accident to an emergency call center.

For example, the accident may correspond to a road traffic collision such as a loss event with the causal participation of road users in road traffic. The accident notification (or information about the accident notification) may for example include information about the accident relevant to emergency services, such as a probable number of injured parties, number and category of road users involved, a schematic representation of the accident location or the accident process and/or geographic position of the accident. The emergency call center may for example correspond to an emergency control center, an emergency service, a police station, or an emergency service. In at least some exemplary embodiments, the emergency call center may correspond to an intermediate service provider that forwards the accident notification to one or more emergency control centers.

The device 10 includes at least one sensor interface 12 designed to receive sensor data from internal sensors and external sensors of the vehicle 100.

For example, the sensor data may include at least one element from the group of ultrasound sensor data, runtime sensor data, radar sensor data, nanoradar sensor data, laser scanner sensor data, camera sensor data, image data, acceleration sensor data, occupant safety sensor data and pedestrian safety sensor data. For example, the device may include at least one subset of internal sensors and external sensors of the vehicle. The internal sensors and external sensors of the vehicle 100 may for example include at least one element from the group of ultrasonic sensors, runtime sensors, radar sensors, nanoradar sensors, laser scanners, camera sensors (for a vehicle interior, or for an environment outside of the vehicle), image sensors, acceleration sensors, occupant safety sensors, seat occupancy sensors and pedestrian safety sensors. The at least one sensor interface 12 may for example correspond to one or more inputs and/or one or more outputs for receiving and/or transmitting information, for example in digital bit values, based on a code, within a module, between modules, or between modules of different entities.

The device 10 furthermore includes at least one communication interface 14 designed to communicate with the emergency call center. The communication interface 14 may for example correspond to a mobile radio interface and/or a mobile radio transceiver module. In exemplary embodiments, the mobile radio transceiver module may typically contain transmitter, or respectively receiver components. This may for example include one or more antenna, one or more filters, one or more mixers, one or more amplifiers, one or more diplexers, one or more duplexers, etc. For example, the communication interface 14 may be designed to communicate by means of at least one mobile radio system from the group comprising: global system for mobile telecommunications (GSM), general packet radio service (GPRS), enhanced data rates for GSM evolution (EDGE), universal mobile telecommunications system (UMTS), long-term evolution, and the fifth generation mobile radio system (5G). For example, the communication with the emergency call center may at least partially include digital data transmission, for example via a short message system (SMS), or via a packet-based data transmission system, such as via the Internet or a vehicle-manufacturer-specific network. In some exemplary embodiments, the communication interface 14 may be designed to communicate via vehicle-to-vehicle communication through a direct wireless communication link with at least one additional vehicle/road user, or a traffic infrastructure (such as without the use of a base station), such as according to IEEE 802.11p (a standard of the Institute of Electrical and Electronics Engineers), or via an indirect communication link (such as by means of a base station). The communication interface 14 may for example be designed to communicate wirelessly directly with other vehicles/road users in an environment.

The device 10 furthermore includes a control module 16 designed to control the at least one sensor interface 12 (and to evaluate the sensor data from the at least one sensor interface 12), and to provide information for the communication interface 14. The control module 16 is coupled to the sensor interface 12 and the communication interface 14.

The control module 16 is designed to determine information about occupants in the vehicle based on the sensor data. For example, determining the information about the occupants in the vehicle may include determining a number of occupants in the vehicle. For example, determining the information about the occupants in the vehicle may include determining a state of the occupants in the vehicle. For example, determining the information about the occupants in the vehicle may include determining a number of injured occupants in the vehicle, and/or determining the severity of injuries of the occupants in the vehicle. For example, the information about the occupants in the vehicle may include at least one element of the group comprising: information about a number of occupants in the vehicle, information about a number of injured occupants in the vehicle, and information about the severity of injuries of the occupants in the vehicle. In at least several exemplary embodiments, the control module 16 may furthermore be designed to determine whether the vehicle has driven under another vehicle (such as a truck) to determine the information about the occupants in the vehicle, for example based on a sensor data link to sensors installed in a roof module of the vehicle.

The control module 16 is furthermore designed to determine information about other road users involved in the accident based on the sensor data. For example, the control module 16 may be designed to identify (differentiate) individual road users involved in the accident based on the sensor data, and to determine the information about the other road users involved in the accident based on the identified (differentiated) road users. For example, the control module 16 may be designed to differentiate whether a road user recognized based on the sensor data was involved in the accident. For example, the control module 16 may be designed to include road users recognized based on the sensor data in the information about the other road users involved in the accident if, based on the sensor data, damage to the road users is to be identified or to be assumed.

For example, the sensor data may include image data from an external camera sensor of the vehicle 100. The control module 16 may be designed to recognize at least some of the other road users involved in the accident based on object recognition in the image data. The control module 16 may be designed to categorize the other road users involved in the accident into a plurality of categories based on the object recognition. For example, the control module 16 may be designed to categorize the additional road users involved in the accident into the plurality of categories. Alternatively or in addition, the control module 16 may be designed to receive information via the communication interface about an identification of at least one of the road users involved in the accident (such as by direct vehicle-to-vehicle communication), and the control module 16 may furthermore be designed to categorize the other road users involved in the accident based on the information about the identification into the plurality of categories. Furthermore, the control module 16 may be designed to plausiblize the sensor data from the sensor interface that are provided to the control module and which may vary, and for example to only provide relevant and valid information to the communication interface 14. For example, the control module 16 may be designed to plausiblize the sensor data before further processing (for example to determine the information about the occupants in the vehicle, or to determine the information about the other road users involved in the accident). For example, the control module 16 may be designed to exclude implausible sensor data from further processing.

The information about the other road users involved in the accident is subdivided into the plurality of categories. The plurality of categories includes at least the categories of pedestrians, two-wheeled vehicles and automobiles. The control module 16 may be designed to categorize the other road users involved in the accident into the plurality of categories, or to classify them according to the plurality of categories. The plurality of categories may furthermore include the categories of commercial vehicles and occupant vehicles. For example, the plurality of categories may for example include at least one element from the group of severity of the accident/an injury, and type of accident/injury. For example, categories of the plurality of categories may include subcategories. For example, the category of two-wheeled vehicles may include the subcategories of motorcycles and bicycles, and the category of automobiles may include the categories of commercial vehicles and occupant vehicles. Alternatively, all of the categories assume the same level of hierarchy. For example, the information about the other road users involved in the accident may include information about an estimated number of road users that are injured or require help. For example, the information about the estimated number of road users that are injured or require help may include information about an estimated severity of the injuries or the medical needs of the road users.

For example, the at least one communication interface 14 may furthermore be designed for vehicle-to-vehicle communication with at least some of the other road users. The control module may be designed to receive information about occupants in vehicles of the other road users via vehicle-to-vehicle communication (for example from at least some of the other road users, or from a vehicle or a traffic infrastructure that is designed to aggregate information on the other road users). The control module 16 may be designed to determine the information about the other road users involved in the accident based on the information about the occupants in vehicles of the other road users. For example, the information about the occupants in the other road users may include at least information about a number of the occupants in vehicles of the other road users. In addition (or alternatively), the information about the occupants in vehicles of the other road users may include information about injuries to the occupants in vehicles of the other road users.

In at least some exemplary embodiments, the control module 16 may furthermore be designed to receive additional sensor data (such as by vehicle-to-vehicle communication) from at least some of the other road users. The control module 16 may be designed to determine the information about the other road users involved in the accident based on the additional sensor data. For example, the control module 16 may be designed to determine the information about the other road users involved in the accident based on a combination of the sensor data and the additional sensor data. Alternatively, the control module 16 may be designed to determine the information on the other road users involved in the accident based on the additional sensor data if no data is included in the sensor data for a section of the accident site. In addition or alternatively, the control module 16 may be designed to verify the sensor data based on the additional sensor data to determine the information about the other road users involved in the accident.

The control module 16 is furthermore designed to provide information about the accident notification via the communication interface 14 based on the information about the occupants in the vehicle, and based on the information about the other road users involved in the accident based on the sensor data. For example, the control module 16 may be designed to provide the information regarding the accident notification based on the information about the occupants in the vehicle, and based on the information about the other road users involved in the accident by using sensor data and information about the occupants in third-party vehicles involved in the accident. For example, the information regarding the accident notification may include at least parts of the information about the occupants in the vehicle, and/or parts of the information about the other road users involved in the accident, for example categorized according to the plurality of categories. For example, the information about the accident notification may include information about an (estimated) number of road users involved in the accident, and/or information about an (estimated) number of occupants in the road users involved in the accident, for example based on or distributed to the plurality of categories. For example, the control module 16 may be designed to transmit information regarding the accident notification as one or more short messages (SMS), or as one or more (encoded) data packages to the emergency call center. For example, the information regarding the accident notification may be included in an expanded data set (extended set of data—ESD), or in a basic data set (minimum set of data—MSD) and the expanded data set of a digital accident notification. Alternatively or in addition, the control module 16 may be designed to provide the information regarding the accident notification by direct vehicle-to-infrastructure communication to a traffic infrastructure, or to transmit it by vehicle-to-X communication (car2X) equally to other vehicles (such as emergency vehicles) and traffic infrastructure.

In at least several exemplary embodiments, the control module 16 may be designed to recognize a pending collision based on the sensor data. For example, the control module 16 may be designed to recognize the pending collision based on runtime sensor data (such as radar data, lidar data, or acoustic runtime sensor data). For example, the control module 16 may be designed to recognize the pending collision based on a pre-crash system of the vehicle 100. For example, the control module 16 may be designed to recognize the pending collision based on information about a time-to-crash (TTC).

The control module 16 may be designed to buffer the sensor data based on the pending collision. For example, the control module 16 may be designed to buffer the sensor data in a ring memory, a ring memory data structure, or a FIFO memory. For example, the control module 16 may be designed to determine the information about the other road users involved in the accident based on the buffered sensor data. For example, the control module 16 may be designed to determine the information about the other road users involved in the accident based on sensor data that were received before the collision. For example, the buffered sensor data may include at least one element from the group of: information about a trajectory of the vehicle or the other road users involved in the accident, information about a speed of the vehicle or the other road users involved in the accident, information about a kind/type/category of the other road users involved in the accident, and information about a time characteristic of the accident. For example, the control module 16 may be designed to process the buffered sensor data for the information regarding the accident notification, for example in a format for data transmission. For example, the control module 16 may be designed to determine the information about the other road users involved in the accident only based on sensor data that were obtained before the collision, or from the internal sensors or from the external sensors before the collision. Alternatively, the control module 16 may be designed to determine the information about the other road users involved in the accident based on the buffered sensor data (determined before the collision) and the current sensor data (determined during or after the collision). For example, when determining the information about the other road users involved in the collision, the control module 16 may be designed to assign sensor data that were ascertained before the collision a higher priority or reliability than sensor data that are ascertained after the collision. Moreover, information may be buffered that specify the accident sequence of events. For example, the trajectory, speed and type of road user may be retained over the time characteristic and converted into a format provided for transmission.

In at least some exemplary embodiments, the sensor data may include image data from an external camera sensor of the vehicle 100. The control module 16 may be designed in order to provide the (anonymized) information about the accident notification based on the image data. The information about the accident notification may include a schematic (perhaps anonymized) representation of the accident based on the image data. For example, the control module 16 may be designed to provide the information regarding the accident notification with the schematic representation of the accident based not on sensor data, which are radar-based and laser scanner-based; but instead the control module may be designed to determine the information regarding the accident notification with the schematic representation additionally on image data from the external camera sensor. For example, the schematic representation of the accident may correspond to a vector-based representation of the accident. For example, the vehicle and/or the other road users involved in the accident may be included as (three-dimensional) polygons, or as individual coordinates in a coordinate system. Alternatively, the schematic representation of the accident may include a photographic image of the accident site in which at least the other road users involved in the accident are included as a schematic representation (such as a dummy representation). The schematic representation of the other road users involved in the accident may depend on an (estimated) severity of damage or injury to the other road users involved in the accident. For example, the provision of the schematic representation of the accident may depend on a jurisdiction in which the vehicle is located. For example, the control module 16 may be designed to adapt the provision of the schematic representation of the accident based on the jurisdiction in which the vehicle is located. Depending on the jurisdiction, the schematic representation of the accident may comprise different (such as more or less) information, or be schematized to a different extent (for example by being transferred into a representation of objects), or the schematic representation of the accident may be transmitted (or not) depending on the jurisdiction.

In the exemplary embodiments, the control module 16 may correspond to any controller or processor or a programmable hardware component. For example, the control module 16 may also be realized as software that is programmed for a corresponding hardware component. The control module 16 may therefore be implemented as programmable hardware with correspondingly adapted software. In this context, any processors such as digital signal processors (DSPs) may be used. Exemplary embodiments are not restricted to a specific type of processor in this context. Any number of processors or also a plurality of processors are conceivable for implementing the control module 14.

Figure 2:
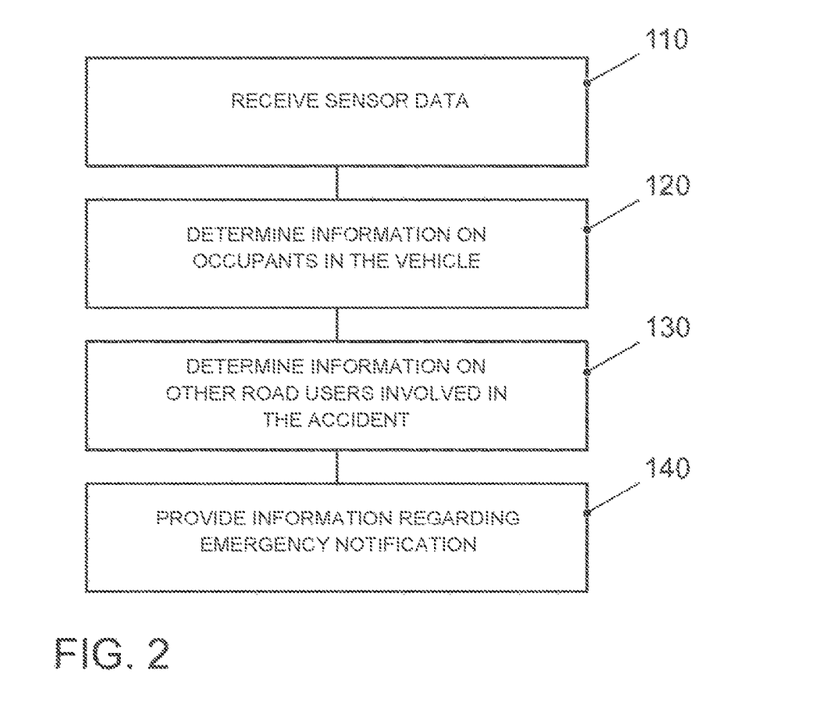
FIG. 2 shows a flowchart of a (corresponding) method for a vehicle for providing an accident notification regarding an accident to an emergency call center.

FIG. 2 shows a flowchart of a (corresponding) method for a vehicle 100 for providing an accident notification regarding an accident to an emergency call center. For example, the device 10 (such as the control module 16 of the device 10) according to FIG. 1 may be designed to execute the method. The method includes receiving 110 sensor data from internal sensors and external sensors of the vehicle 100. The method furthermore includes determining 120 information about occupants in the vehicle based on the sensor data. The method furthermore includes determining 130 information about other road users involved in the accident based on the sensor data. The information about the other road users involved in the accident is subdivided into a plurality of categories. The plurality of categories includes at least the categories of pedestrians, two-wheeled vehicles and automobiles. The method furthermore includes providing 140 information about the accident notification based on the information about the occupants in the vehicle, and based on the information about the other road users involved in the accident based on the sensor data.

More details and aspects of the method will be mentioned in conjunction with the approach or examples that were described above (such as FIG. 1). The method may comprise one or more additional optional features which correspond to one or more aspects of the proposed approach or the described examples as described above or below.

At least several exemplary embodiments establish a commercial emergency call signal with additional accident/collision information about vehicle assistance systems (also commercial SOS: additional crash information via driver assistance systems).

In an automated emergency call, a number of the occupants is mentioned to a call center (or rescue coordination center) in order to estimate the number of participants involved in the accident. In this case, only the occupants that were detected by the emergency call system benefit. Other participants involved in the accident are left out in the accident notification. In at least several exemplary embodiments, other participants involved in the accident may also benefit, for example because an adequate number of, and the correct, rescue teams appear at the accident site and are already informed.

From an aggregated data fusion from the sensors, for example other participants involved in the accident may be ascertained and classified (such as the number, type, severity of the accident, type of the accident . . . ) and transmitted to the telematics speaking point (TSP, a call center for emergency calls).

The data fusion may be supplied with data (optionally), etc. from sensors such as ultrasound, radar, nanoradar, laser scanner, camera (such as by object recognition), Car2X (vehicle-to-vehicle/vehicle-to-infrastructure communication). A control module may be designed to ascertain the relevant objects that are involved in a collision, and to classify them as a two-wheeled vehicle driver, occupant car, truck, pedestrian . . . (into the plurality of categories). Optionally, data on trajectories, ego data, as well as other vehicle data from the participants involved in the accident may also be ascertained.

By means of Car2X, other data from the other participants involved in the accident may be retrieved and transmitted such as the number of occupants at the location, severity of the accident, number and type of the vehicles colliding with them, ego (data from one's own vehicle), and respectively target data (target vehicle data).

The aggregated information may be provided to the emergency call module. The control center (TSP, call center) may be supplied by data transfer. The received data may for example be automatically processed in a GUI (graphical user interface), or respectively in a brief, anonymized 3-D simulation and shown to the agent or rescue team. The method may be "secured protected from the outside".

The knowledge (number, type, occupants, ego/target data, . . . ) in an accident of other road users that is produced by the aggregated use of sensor data, as well as the prepared and protected provision of said knowledge to a rescue coordination center (call center, TSP, emergency services) may enable a more appropriate use of rescue teams.

In an accident, the rescue coordination center may dispatch the necessary and previously informed rescue teams to each participant involved in the accident. In doing so, the data used may be anonymized and possibly encoded. A transmission of camera images (internal as well as external) to the rescue coordination center (all-around) may be done according to local legal guidelines of the jurisdiction in which the vehicle is located.

For example, the (sensor) data before an accident may be available, for example by the TTC (time-to-collision) calculations by the precrash functions; this data may accordingly also be in the emergency call module in a serious accident.

Figure 3:
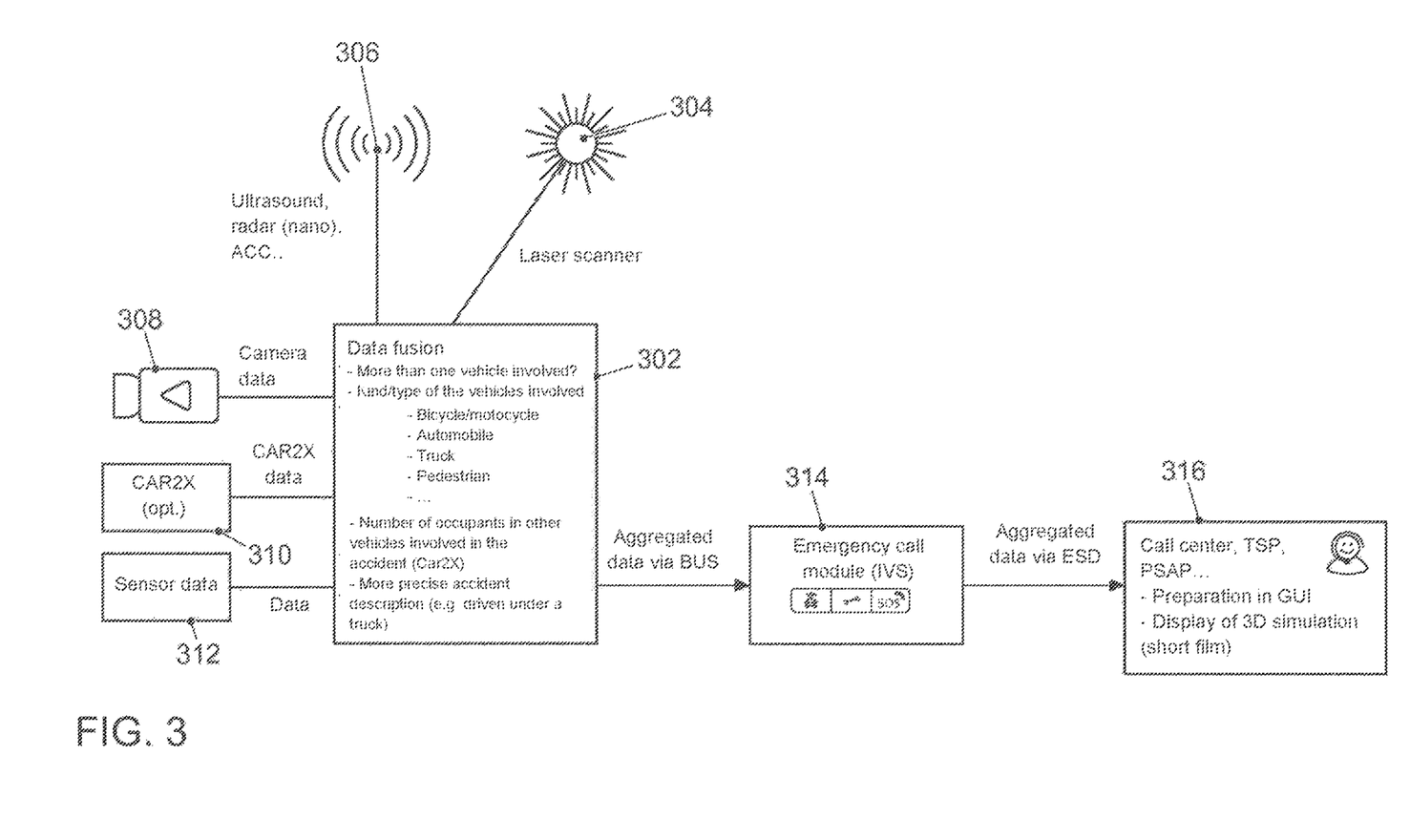
FIG. 3 shows a block diagram of a system for an aggregation of surrounding data from the sensors for specifying an emergency call.

FIG. 3 shows a block diagram of an exemplary embodiment of a system for an aggregation of surrounding data from the sensors for specifying an emergency call. The system comprises a control module 302 designed for a data fusion of sensor data. For example, the control module 302 may be designed to receive sensor data from a laser scanner 304, from a runtime system (ultrasound, radar (nano), adaptive cruise control—ACC) 306, from a camera 308, through a car2X system 310, or additional sensor data 312 for the data fusion. On this basis, the control module 302 may be designed to recognize the relevant active participants involved in the accident/objects and forward the aggregated data via a data bus to an emergency call module 314. Likewise, the control module 302 may be capable of not forwarding additional relevant participants involved in the accident/objects (except for one's own vehicle). The emergency call module 314 may be designed to provide the aggregated data (information regarding the emergency call) from an emergency call center 316, such as a call center, a telematic speaking point or a public safety answering point (PSAP, an emergency call center). For example, the control module 302 may correspond to the control module 16 which was presented in conjunction with FIG. 1. The emergency call module 314 may correspond to the communication interface 14 from FIG. 1.

Customer Experience:

A rescue vehicle may for example be dispatched not just for one participant involved in the accident (in case of doubt, initial treatment may for example not be provided for the customer).

Specialists for any accident situation (motorcycle, truck) may be called.

Functional Description:

Information from the sensors are fused (may be available in a central module/control unit).

The relevant participants involved in the accident or respectively objects are ascertained (may for example be obtained from precrash functions).

The information is provided (possibly encoded) via the emergency call module (such as an in-vehicle system) to the TSP, and the sensor information is therefore linked to the rescue teams.

The following aspects may for example be checked in the data fusion:

More than one involved vehicle?
Kind/type of involved vehicles
Bicycle/motorcycle
Car
Truck
Pedestrian
Number of occupants in other participants involved in the accident (Car2X)
More precise description of the accident (such as driving under truck)

More details and aspects of the system are discussed in conjunction with the approach or examples that were described in the preceding (such as FIGS. 1 and 2). The system may comprise one or more additional optional aspects which correspond to one or more features of the proposed approach or the described examples as described above or below.

Another exemplary embodiment is a computer program for executing at least one of the above-described methods, if the computer program runs on a computer, a processor, or a programmable hardware component. Another exemplary embodiment is also a digital storage medium that is machine or computer-readable, and that has electronically-readable control signals which may interact with a programmable hardware component so that one of the above-described methods is executed.

The features disclosed in the above description, the following claims and the accompanying figures may be relevant and implemented in their different embodiments both individually as well as in any combination to realize an exemplary embodiment.

Although many aspects were described in conjunction with a device, it is understood that these aspects also represent a description of the corresponding method so that a block or a component of a device is also to be understood as a corresponding method step or as a feature of a method step. Analogously, aspects that were described in conjunction with or as a method step, also represent a description of a corresponding block or details or a feature of a corresponding device.

Depending on specific implementation requirements, exemplary embodiments of the invention may be implemented in hardware or in software. The implementation may be performed using a digital storage medium such as a floppy disk, DVD, Blu-ray disc, CD, ROM, PROM, EPROM, EEPROM or flash memory, hard disk, or another magnetic or optical memory on which electronically-readable control signals are saved that interact or may interact with a programmable hardware component so that the respective method is performed.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a single chip system (SOC=system-on-a-chip), a programmable logic element or a field-programmable gate array with a microprocessor (FPGA=field-programmable gate array).

The digital storage medium may therefore be machine or computer-readable. Several exemplary embodiments therefore comprise a data carrier that has electronically-readable control signals which are capable of interacting with a programmable computer system or a programmable hardware component such that a method described herein is performed. An exemplary embodiment is accordingly a data carrier (or a digital storage medium or a computer-readable medium) on which the program for performing one of the methods described herein is recorded.

In general, exemplary embodiments of the present invention may be implemented as a program, firmware, computer program or computer program product with a program code or as data, wherein the program code or the data is, or respectively are effective in performing one of the methods when the program runs on a processor or a programmable hardware component. The program code or the data may for example also be saved on a machine-readable carrier or data carrier. The program code or the data may inter alia exist as source code, machine code or byte code as well as another intermediate code.

Another exemplary embodiment is furthermore a stream of data, a signal sequence, or a sequence of signals that represents, or respectively represent the program for performing one of the methods described herein. The stream of data, the signal sequence or the sequence of signals may for example be configured in order to be transferred via a data communication link, such as via the Internet or another network. Exemplary embodiments are accordingly also signal sequences representing data that are suitable for being transmitted via a network or a data communication link, wherein the data represent the program.

A program according to one exemplary embodiment may for example implement one of the methods while it is being performed for example in that it reads out memory areas, or a datum or several data are written to them, whereby possibly switching processes or other processes are evoked in transistor structures, in amplifier structures or in other components which are electrical, optical or magnetic or which function according to another functional principle. Correspondingly, by reading out a memory area, data, values, sensor values, or other information may be recorded, determined or measured by a program. A program may therefore record, determine or measure quantities, values, measurands and other information by reading out one or more memory areas, and may cause, induce or perform an action by writing to one or more memory areas, or control other units, machines and components.

The above-described exemplary embodiments merely represent an illustration of the principles of the present invention. Of course, modifications and variations of the arrangements and details described herein are apparent to other persons skilled in the art. It is therefore intended that the invention is only restricted by the scope of protection of the following claims, and not by the specific details which were presented herein with reference to the description and the explanation of the exemplary embodiments.

REFERENCE NUMBER LIST

10 Device
12 Sensor interface
14 Communication interface
16 Control module
100 Vehicle
110 Receive sensor data
120 Determine information on occupants in the vehicle
130 Determine information on other road users involved in accidents
140 Provide information regarding emergency notification
302 Control module
304 Laser scanner
306 Runtime system
308 Camera
310 Car2X system
312 Additional sensor data
314 Emergency call module
316 Emergency call center The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the words "comprising" and "including" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A device for a vehicle for providing an accident notification regarding an accident to an emergency call center, the device comprising:
at least one sensor interface configured to receive sensor data from internal sensors and external sensors of the vehicle;
at least one communication interface configured to communicate with the emergency call center; and
a control circuit configured to:
control the at least one sensor interface and the communication interface;
determine information about occupants in the vehicle based on the sensor data;
determine information about other road users involved in the accident based on the sensor data, wherein the information about the other road users involved in the accident is subdivided into a plurality of categories, wherein the plurality of categories includes at least the categories of pedestrians, two-wheeled vehicles and automobiles;
conduct object recognition on the sensor data;
recognize at least some of the other road users involved in the accident based on the object recognition of the sensor data;

categorize the other road users involved in the accident into the plurality of categories based on the object recognition;

provide information about the accident notification via the communication interface based on the information about the occupants in the vehicle and based on the information about the other road users involved in the accident based on the sensor data.

2. The device according to claim 1, wherein the control circuit is configured to recognize a pending collision based on the sensor data, and wherein the control circuit is configured to buffer the sensor data based on the pending collision.

3. The device according to claim 2, wherein the control circuit is configured to recognize a pending collision based on the sensor data, and to determine the information about the other road users involved in the accident based on sensor data that were received before the collision.

4. The device according to claim 2, wherein the at least one communication interface is furthermore configured for vehicle-to-vehicle communication with at least some of the other road users, wherein the control circuit is configured to receive information about occupants of the other road users via vehicle-to-vehicle communication, and wherein the control circuit is configured to determine the information about the other road users involved in the accident based on the information about the occupants of the other road users.

5. The device according to claim 1, wherein the control circuit is configured to recognize a pending collision based on the sensor data, and to determine the information about the other road users involved in the accident based on sensor data that were received before the collision.

6. The device according to claim 5, wherein the at least one communication interface is furthermore configured for vehicle-to-vehicle communication with at least some of the other road users, wherein the control circuit is configured to receive information about occupants of the other road users via vehicle-to-vehicle communication, and wherein the control circuit is configured to determine the information about the other road users involved in the accident based on the information about the occupants of the other road users.

7. The device according to claim 1, wherein the at least one communication interface is furthermore configured for vehicle-to-vehicle communication with at least some of the other road users, wherein the control circuit is configured to receive information about occupants of the other road users via vehicle-to-vehicle communication, and wherein the control circuit is configured to determine the information about the other road users involved in the accident based on the information about the occupants of the other road users.

8. The device according to claim 7, wherein the information about the occupants of the other road users includes information about injuries of the occupants of the other road users.

9. The device according to claim 7, wherein the at least one communication interface is furthermore configured for vehicle-to-vehicle communication with at least some of the other road users, wherein the control circuit is configured to receive additional sensor data from at least some of the other road users and wherein the control circuit is configured to determine the information about the other road users involved in the accident based on the additional sensor data.

10. The device according to claim 7, wherein the sensor data include image data from an external camera sensor of the vehicle, wherein the control circuit is configured to provide the information about the accident notification based on the image data, wherein the information about the accident notification includes a schematic representation of the accident based on the image data.

11. The device according to claim 1, wherein the at least one communication interface is furthermore configured for vehicle-to-vehicle communication with at least some of the other road users, wherein the control circuit is configured to receive additional sensor data from at least some of the other road users and wherein the control circuit is configured to determine the information about the other road users involved in the accident based on the additional sensor data.

12. The device according to claim 11, wherein the sensor data include image data from an external camera sensor of the vehicle, wherein the control circuit is configured to provide the information about the accident notification based on the image data, wherein the information about the accident notification includes a schematic representation of the accident based on the image data.

13. The device according to claim 1, wherein the sensor data include image data from an external camera sensor of the vehicle, wherein the control circuit is configured to provide the information about the accident notification based on the image data, wherein the information about the accident notification includes a schematic representation of the accident based on the image data.

14. A method for a vehicle for providing an accident notification regarding an accident to an emergency call center, the method including:

receiving sensor data from internal sensors and external sensors of the vehicle;

determining information about occupants in the vehicle based on the sensor data;

determining information about other road users involved in the accident based on the sensor data, wherein the information about the other road users involved in the accident is subdivided into a plurality of categories, wherein the plurality of categories includes at least the categories of pedestrians, two-wheeled vehicles and automobiles;

conduct object recognition on the sensor data;

recognizing at least some of the other road users involved in the accident based on the object recognition of the sensor data;

categorizing the other road users involved in the accident into the plurality of categories based on the object recognition; and providing information about the accident notification based on the information about the occupants in the vehicle, and based on the information about the other road users involved in the accident based on the sensor data.

15. A non-transitory medium comprising program code for performing the method according to claim 14 when the program code is run on a computer, a processor, a control circuit, or a programmable hardware component.

* * * * *